(12) United States Patent
Boyce et al.

(10) Patent No.: US 8,337,129 B2
(45) Date of Patent: Dec. 25, 2012

(54) WHEEL NUT LOCK

(76) Inventors: Bruce Richard Boyce, Calgary (CA); Warren Winston Hutchings, Calary (CA)

( * ) Notice: Subject to any disclaimer, the term of this patent is extended or adjusted under 35 U.S.C. 154(b) by 404 days.

(21) Appl. No.: 12/662,299

(22) Filed: Apr. 9, 2010

(65) Prior Publication Data
US 2011/0250036 A1    Oct. 13, 2011

(51) Int. Cl.
F16B 39/02    (2006.01)
(52) U.S. Cl. ............... 411/102; 411/14; 411/90; 411/92
(58) Field of Classification Search ............... 411/14, 411/90, 92, 102
See application file for complete search history.

(56) References Cited

U.S. PATENT DOCUMENTS

| | | | | | |
|---|---|---|---|---|---|
| 2,423,918 | A | * | 7/1947 | Wohlhieter | 411/97 |
| 3,623,761 | A | * | 11/1971 | Nadherny | 411/90 |
| 4,737,057 | A | * | 4/1988 | Olsson | 411/92 |
| 5,181,767 | A | * | 1/1993 | Hudgins et al. | 301/37.375 |
| 5,842,749 | A | * | 12/1998 | DiMarco | 301/37.375 |
| 6,158,933 | A | * | 12/2000 | Nicholson | 411/14 |
| 6,409,224 | B1 | * | 6/2002 | Schmidt et al. | 285/124.3 |
| 6,450,746 | B1 | * | 9/2002 | Kirimoto | 411/95 |
| 6,561,124 | B1 | * | 5/2003 | Marczynski et al. | 116/309 |
| 7,451,567 | B2 | * | 11/2008 | Irvine | 43/17.2 |
| 2007/0231103 | A1 | * | 10/2007 | Evans et al. | 411/102 |
| 2009/0060677 | A1 | | 3/2009 | Adams | |

OTHER PUBLICATIONS

U.S. Appl. No. 29/323,756, Boyce.
U.S. Appl. No. 29/323,758, Boyce.
Manufacturer Direct Ltd., 2006 Product Catalog.
Adam James Associates, Ltd., "Never Lose Another Wheel Nut!! Ever!!", Email circular, Jul. 16, 2002.
Adam James Associates, Ltd., "Safety-Link Press Release", unknown publication date.
Safety Link (UK), "An End to Wheel Nut Loss", distributed in 1999 and 2000.
Safety Link, "Safety-Link Wheel Nut Management System", Feb. 21, 2002.
Safety Link, "Safety-Link Wheel Nut Management System", Feb. 12, 2002.
Steve Surges, "Safety Link Prevents Lug Nut Loss", Truckinginfo. com, published Aug. 2001 at http://www.truckinginfo.com/news/news-detail.as?news_id=433972.
Truckinginfo, "Lug Nut Loss Preventer", published on truckinginfo. com in Aug. 2001 at http://www.truckinginfo.com/2001/08/080c0108.asp.

(Continued)

*Primary Examiner* — Roberta Delisle
(74) *Attorney, Agent, or Firm* — Richard Okimaw

(57) ABSTRACT

Disclosed is an apparatus for locking and flagging a wheel nut, the wheel nut being rotatable about a central axis to a secured position. The apparatus comprises a substantially cylindrical body having a toothed central bore therein sized to closely surround and engage a periphery of the wheel nut. The cylindrical body having a slot therein so as to permit the cylindrical body to be radially expandable. The apparatus further comprises a first extension extending perpendicularly from the body having an indicator thereon and a second extension extending perpendicularly from the body to an opposed side thereof. The second extension having a distal end adapted to overlap and engage with a first extension of an adjacent wheel nut cover so as to cover the indicator of the adjacent wheel nut cover when the wheel nut is in a secured position.

9 Claims, 5 Drawing Sheets

OTHER PUBLICATIONS

Truckinginfo, "The Best 50 Products of 2001", published on truckininfo.com in Mar. 2002 at http://www.truckinginfo.com/2002,03,080a0203asp.

Express Export Services Ltd., Invoice No. 02112 issued to Messrs Sieger (UK) Limited in Oxfordshire, United Kingdom for Wheel Nut Safety Devices, dated Jun. 10, 2002.

Trevor Wardel, Safety Link UKk, Email dated Sep. 29, 2005 to Jim Adams regarding shipment of clips.

Manufacturer Direct Ltd., Quotation to Bison Tranpsort dated Aug. 18, 2006 for SafetyLink Wheel Nut Management System.

United States District Court—Eastern District of Texas, Plaintiff's Original Complaint, Case 4:2008-CV-415 *Safety Link International* vs *Bruce Boyce and Manufacturer Direct L*.

Safety Link International Inc., Press Release, Jan. 29, 2008.

* cited by examiner

WHEEL NUT LOCK

BACKGROUND OF THE INVENTION

1. Field of Invention

The present invention relates to position indicators in general and in particular to a wheel nut angular position indicator and locking device.

2. Description of Related Art

In the field of automobiles, wheels are commonly secured to a hub or axel of the vehicle by a plurality of wheel nuts or lug nuts. Such wheel nuts are required to be tightened to a specified torque to ensure the wheel is securely retained on the hub. A nut that is tightened too much may risk damaging the nut or the stud extending from the hub, while a nut that is not tightened enough may risk loosening. It is well known that loosened wheel nuts are undesirable due to the possibility of the wheel becoming unstable or loose and possibly losing the wheel.

Previous attempts to indicate whether a wheel nut is tight has been to provide a body locatable around the nut which is has an indicator thereon for indicating to a user when the nut has rotated out of a desired position. Examples of such devices are disclosed in US Patent Application Publication No US2009/0060677 to Adams, published Mar. 5, 2009, the entirety of which is incorporated herein by reference.

Such previous devices however have been difficult and time consuming to install, remove and operate. In particular, such previous designs have an opening for fitting around the wheel nut that has a fixed diameter. Due to this fixed diameter, it has previously been necessary to thoroughly clean the nut prior installation of the device so as to prevent any accumulated dirt and debris from binding the device or impeding the installation. Such fixed diameter devices have also been difficult to install in cold climates where the device may shrink due to the coefficient of thermal expansion of the material used to form the device.

Other difficulties with the previous designs are that the covers have included a fixed cross-section opening through the device. Such fixed opening has made installation more difficult due to the need to accurately align the cover with the wheel nut. Such accurate alignment is difficult in dirty environments, especially when the wheel nut is not adequately cleaned. In addition, previous devices have utilized a differently colored portion that is only visible that wheel nut has been rotated out of a position that it is covered by an adjacent cover. In dirty environments, such color differences are difficult to see when the entire wheel assembly is covered by a layer of dirt, road salt and other debris.

SUMMARY OF THE INVENTION

According to a first embodiment of the present invention there is disclosed an apparatus for locking and flagging a wheel nut, the wheel nut being rotatable about a central axis to a secured position. The apparatus comprises a substantially cylindrical body having a toothed central bore therein sized to closely surround and engage a periphery of the wheel nut. The cylindrical body having a gap therein so as to permit the cylindrical body to be radially expandable. The apparatus further comprises a first extension extending perpendicularly from the body having an indicator thereon and a second extension extending perpendicularly from the body to an opposed side thereof. The second extension having a distal end adapted to overlap and engage with a first extension of an adjacent apparatus for locking and flagging an adjacent wheel nut so as to cover the indicator of the adjacent apparatus when the wheel nut is in a secured position.

The gap may be substantially aligned with the central axis. The gap may be disposed between a pair of opposed arms, wherein the arms form a portion of the central toothed bore. The arms may be radially biased towards a center of the toothed central bore. The arms may extend between proximate and distal ends, the proximate ends being secured to the cylindrical body and the distal ends forming the gap therebetween, wherein the arms are cantilvered towards each other.

The slot may be located adjacent to the second extension. The arms may be separated from the second extension by a slot. The slot may be semi-circular. The slot may extend between 55 and 165 degrees around the central axis.

The indicator may comprises an aperture extending through the first extension. The aperture may have a triangular shape. The toothed central bore may extend between front and rear end surfaces. The toothed central bore may include a tapered inlet adjacent to the rear end surface of the toothed central bore.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention wherein similar characters of reference denote corresponding parts in each view.

DETAILED DESCRIPTION

Figure 1:
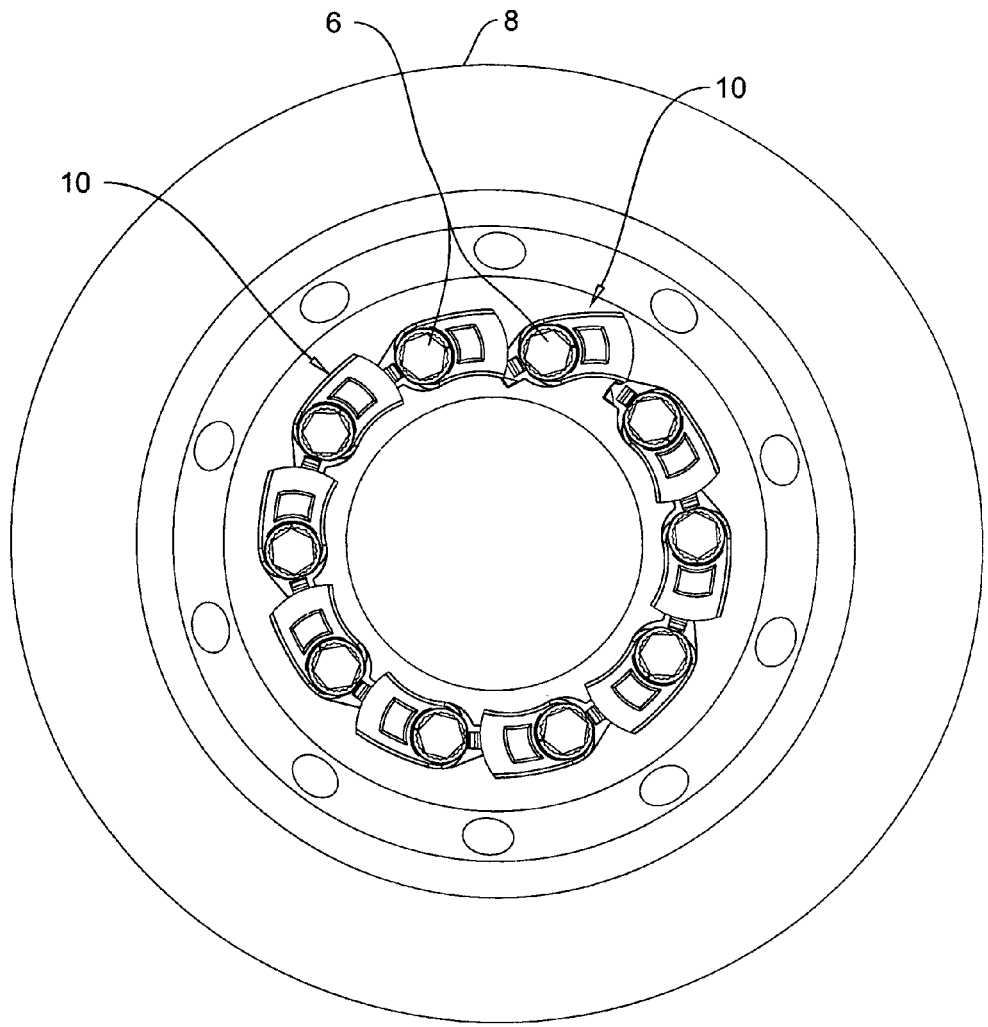
FIG. 1 is a side view of a wheel having a plurality of wheel nuts each having a wheel nut cover.

Referring to FIG. 1, a plurality of apparatuses for locking and flagging a plurality of wheel nuts 6 of a wheel 8 according to a first embodiment of the invention are shown generally at 10. The plurality of apparatuses 10 are interlinked with each other so as to form a continuous loop around the wheel 8 as illustrated.

Figure 2:
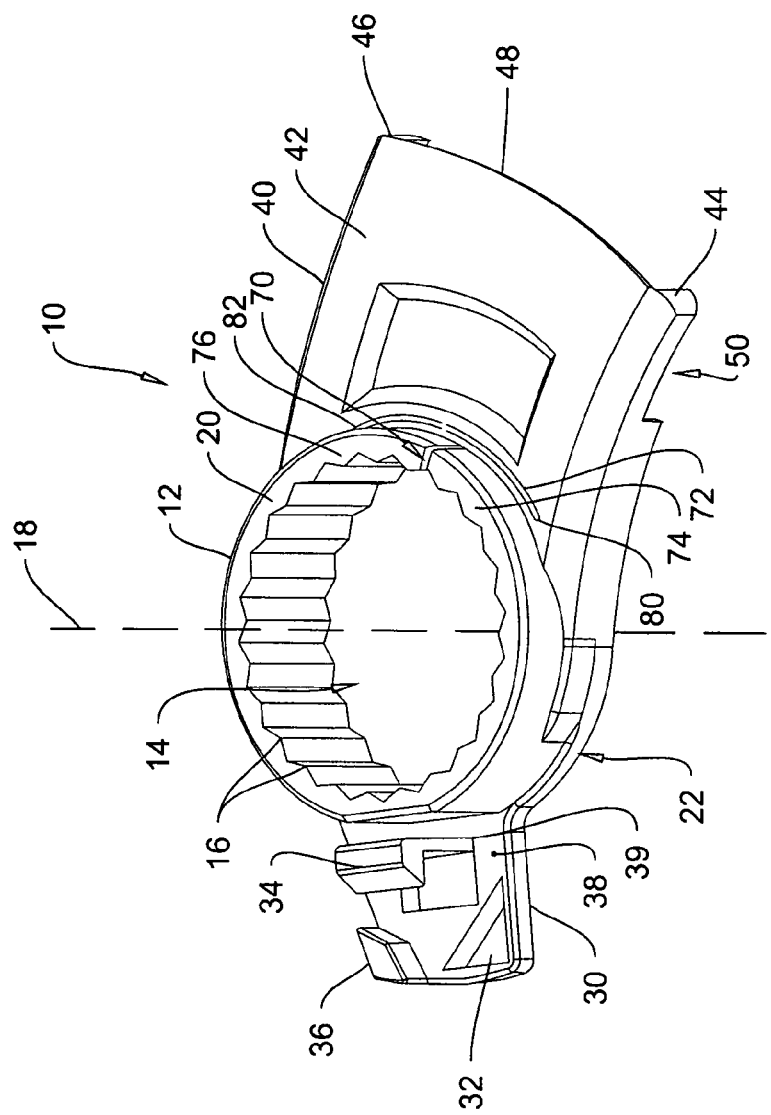
FIG. 2 is a perspective view of a wheel nut cover according to a first embodiment of the present invention.
Figure 3:
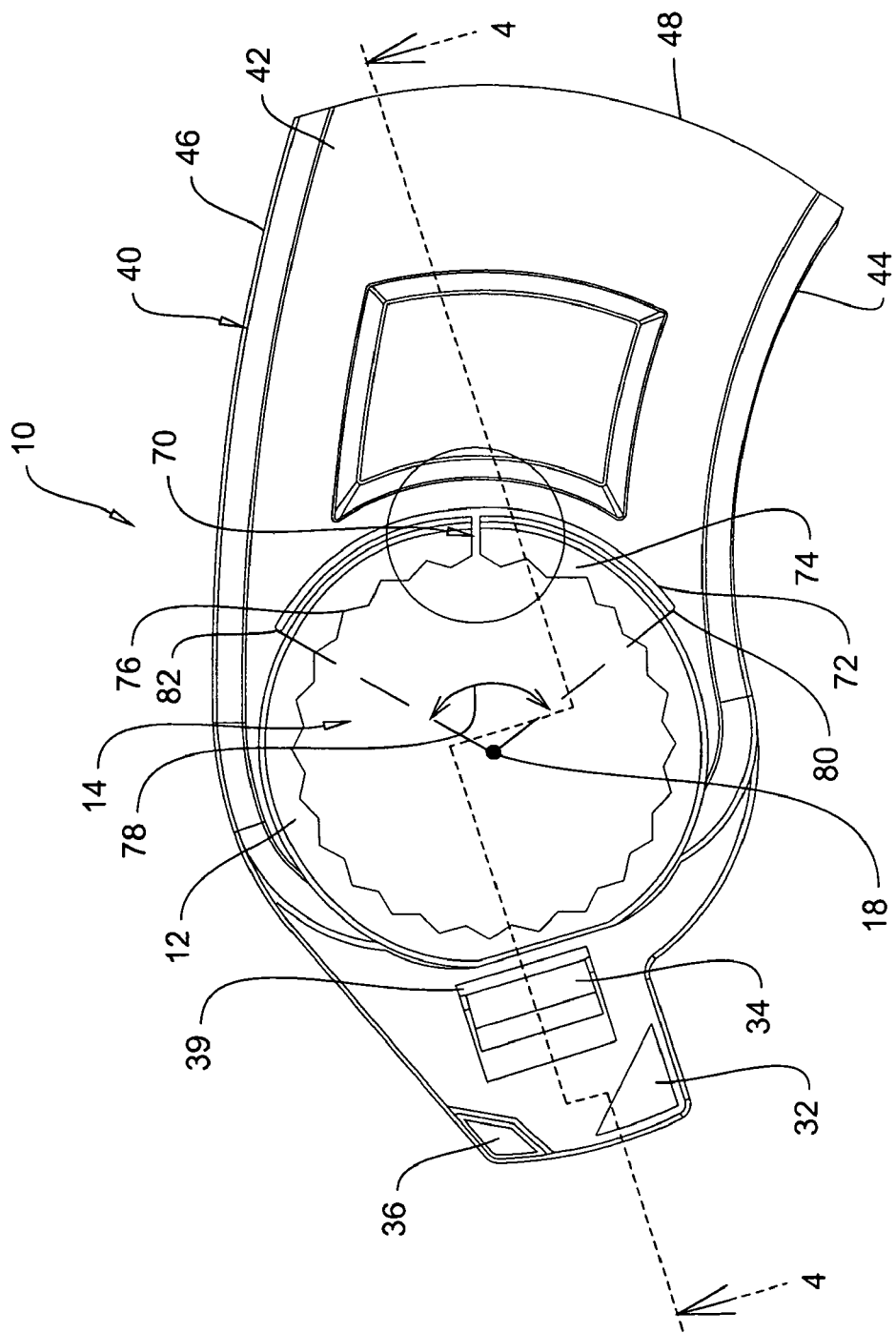
FIG. 3 is a side view of the wheel nut cover of FIG. 2.

Turning now to FIGS. 2 and 3, one embodiment of the present apparatus is illustrated generally at 10 comprising a central body 12 and first and second extensions, 30 and 40 respectively, extending from the central body. The central body 12 includes a central toothed bore 14 therethrough having a plurality of ridges or teeth 16 therearound extending along a central axis 18. The central bore 14 is sized to correspond to the diameter of a wheel nut 6 and the teeth are adapted to grip the sides of the wheel nut to prevent slippage of the apparatus 10 on the nut 6. When installed on a wheel nut 6, the central axis 18 will correspond to an axis of the wheel nut 6. The central body 12 extends between front and rear surfaces, 20 and 22, respectively.

The first extension 30 comprises a planar member extending from the central body 12 perpendicularly to the central bore axis 18. The first extension 30 includes an indicator 32, a latch 34 and a rotation stop post 36. The indicator 32 comprises a passage through the first extension 30. As illustrated the indicator 32 may comprise a triangular passage although it will be appreciated that other outline shapes may be utilized as well. As will be further described below, the indicator 32 is adapted to be selectably uncovered by the second extension of an adjacent apparatus 10 upon rotation of the wheel nut out of a secured or desired position. The latch 34 is adapted to engage the second extension and retains an adjacent apparatus 10 into proximity with the first extension and may include a filleted connection 39 with the top surface 38. The stop post 36 is sized and located to engage an underside of the second extension to prevent excessive rotation of the apparatus 10 as will be further described below.

The second extension 40 comprises a planar member 42 extending from the central body 12 to an opposed side of the central body as the first extension 30. The planar member 42 is located at a distance between front and rear surfaces 20 and 22 closer to the front surface of the central body 12 so as to overly the first extension 30 when adjacent apparatuses are installed on adjacent wheel nuts. The second extension 40 includes first and second side walls 44 and 46 and a distal end 48. The distal end 48 has a radius about the central axis 18 of the central bore and sized to be engaged by a latch 34 of an adjacent apparatus 10 as illustrated in FIG. 1. The first and second walls 44 and 46 extend from the planar member 42 in a direction towards the rear surface 22 of the central body 12. The first side wall 44 includes a notched portion 50 adapted to permit the first extension of an adjacent apparatus 10 to pass thereunder when the adjacent apparatus is rotated about its wheel nut 6 and central axis 18.

As illustrated, the first and second extensions 30 and 40 are angularly oriented relative to each other such that successive interlinked apparatuses 10 form a continuous loop around the wheel 8 to which they are applied. In a secured position, each planar member 42 of a second extension 40 will overlay and conceal an indicator of an adjacent apparatus as illustrated in FIG. 1. As illustrated, the first side wall 44 of the second extension is located to an inward direction of such loop as is the indicator 32. It will therefore be seen that when the wheel nut 6 is loosened by rotation in a counter-clockwise direction, the apparatus 10 will be rotated in a similar counter-clockwise rotation so as to uncover the indicator 32 from underneath the planar member 42 of an adjacent second extension 40 as illustrated for the topmost wheel nut indicator in FIG. 1.

Figure 4:
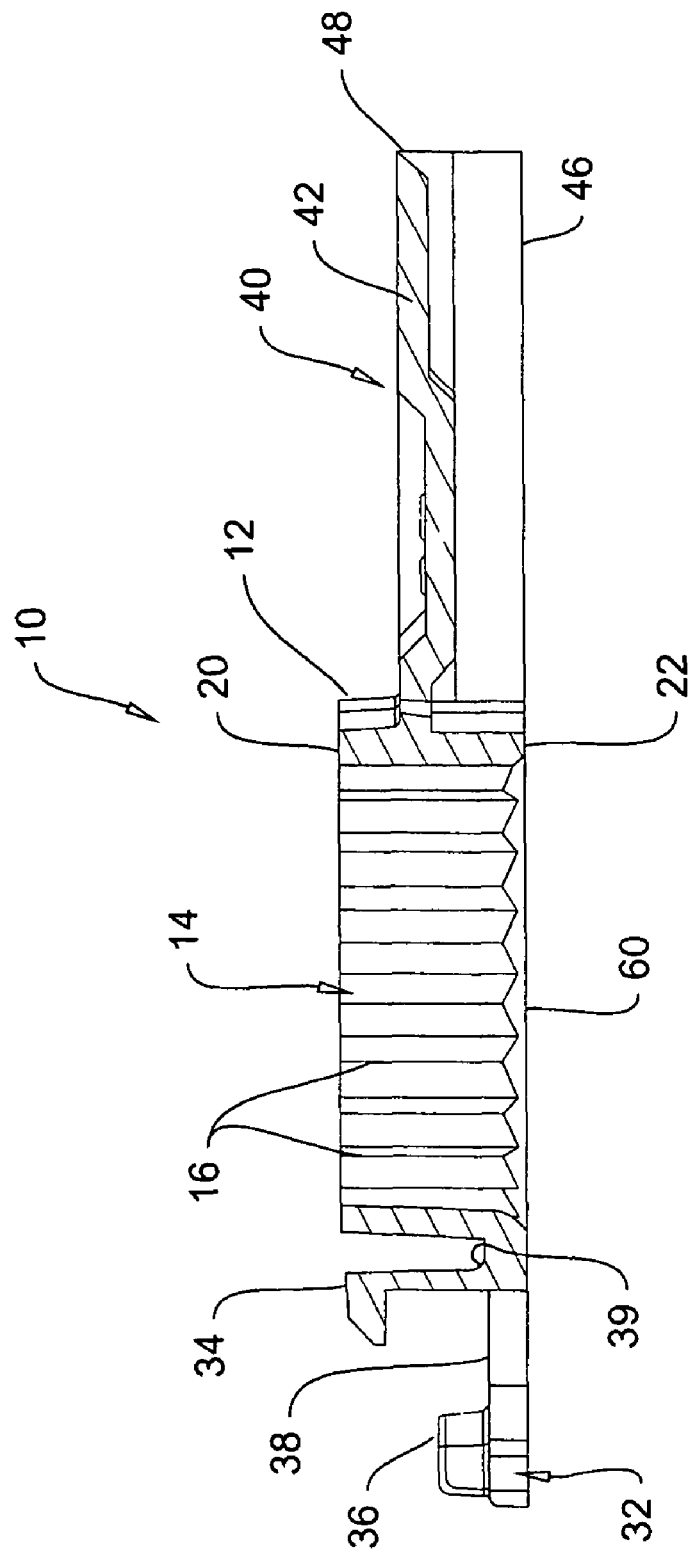
FIG. 4 is a cross sectional view of the wheel nut cover of FIG. 2 taken along the line 4-4.
Figure 5:
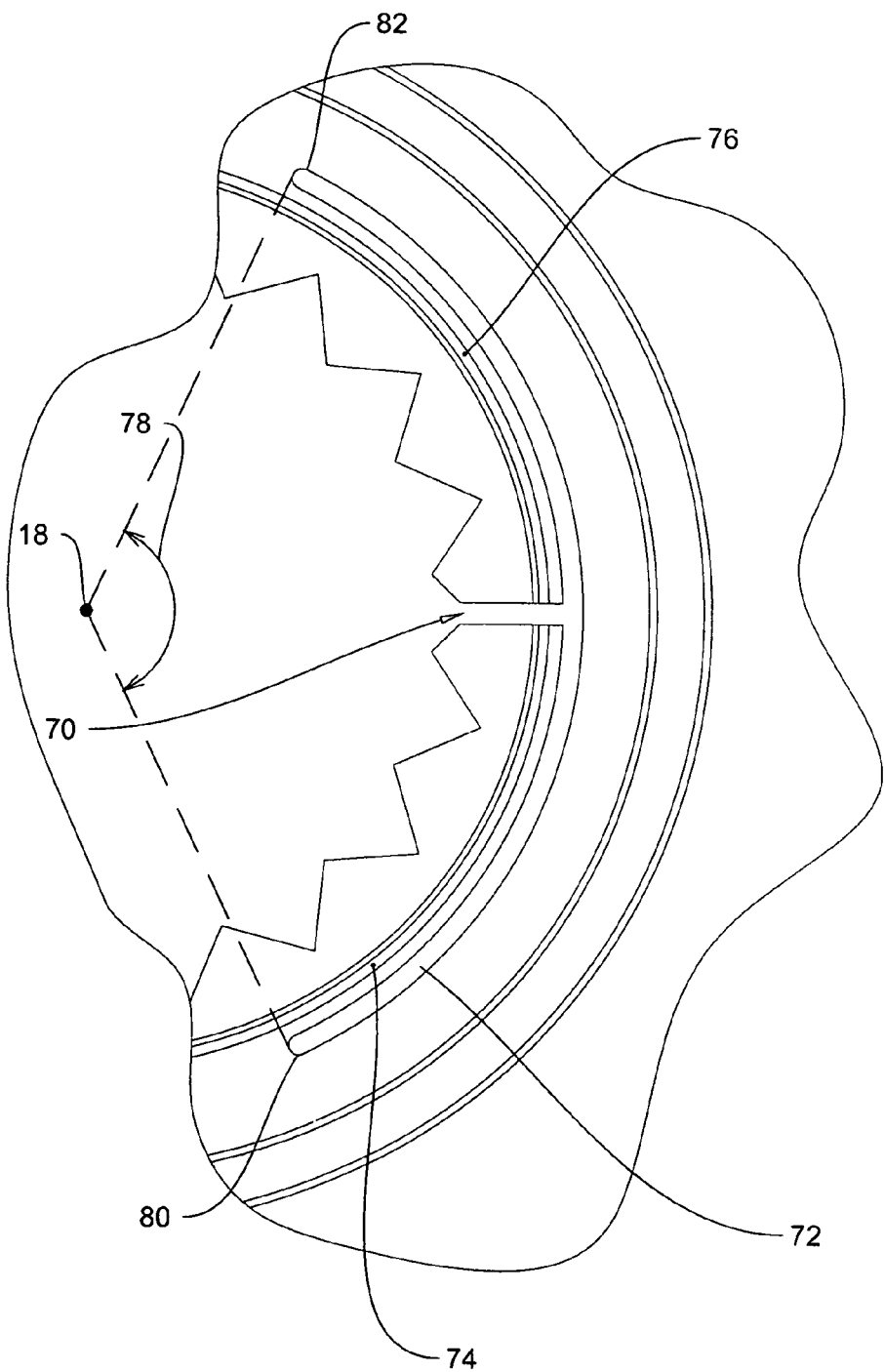
FIG. 5 detailed view of the slot and arms of the wheel nut cover of FIG. 2.

Turning to FIG. 4, a cross-sectional view of the apparatus 10 as taken along the line 4-4 is illustrated. The central bore 14 includes a beveled edge 60 intersecting the rear surface 22 so as to provide a greater radius for the wheel nut 6 to engage upon and therefore to facilitate loading of the apparatus 10 thereon.

The central body 12 includes a gap 70 formed therein extending from the toothed central bore 14 to permit the central bore 14 to be biasedly radially expandable extending along the central body 12 in substantial alignment with the axis 18. As illustrated in the accompanying figures, the gap 70 may be located adjacent to the second extension 40 although it will be appreciated that other locations may be suitable as well. The gap 70 extends between the central bore 14 and a partially circumferential slot 72 formed in the second extension. The partially circumferential slot 72 separates first and second arms 74 and 76 from the remainder of the apparatus 10. As illustrated the first and second arms 74 and 76 form part of the central bore 14 and are radially biased so as to permit the central bore 14 to be radially expandable to accommodate dirty or off-size wheel nuts. The slot 72 extends between first and second ends 80 and 82 and defines a slot angle therebetween generally indicated at 78. The slot angle may be selected from between 55 and 165 degrees although it will be appreciated that other angles may be useful as well. The slot 72 and gap 70 may have a width selected to permit the central bore 14 to be radially expandable to accommodate wheel nuts of slightly different sizes due to dirt rust and other debris. By way of non-limiting example, a width of the slot and gap of 0.032 inch (0.81 mm) although it will be appreciated that other widths may also be useful.

The first and second arms 74 and 76 may have a thickness selected to provide a desired amount of radial biasing force upon a wheel nut received within the central bore 14. It will be appreciated that the thickness of the first and second arms 74 and 76 will vary depending upon the length of the first and second arms between the first and second ends 80 and 82 of the slot 72 and the gap 70. It will also be appreciated that the thickness of the first and second arms 74 and 76 will be varied depending upon the material utilized to form the apparatus.

The apparatus 10 may be formed by any known method including, casting, machining or injection molding as well as any other known suitable method.

The materials utilized to form the apparatus 10 may be of any suitable material such as, by way of non-limiting example, thermoplastics such as polypropylene, polyvinyl chloride (PVC), polyethylene, (PE), polycarbonate, cellulose acetate, acrylonitrile butadiene styrene (ABS), nylon, glass filled nylon and composites thereof, acrylic, metals such as steel, aluminum, copper or alloys, or composite materials While specific embodiments of the invention have been described and illustrated, such embodiments should be considered illustrative of the invention only and not as limiting the invention as construed in accordance with the accompanying claims.

What is claimed is:

1. An apparatus for locking and flagging a wheel nut, the wheel nut being rotatable about a central axis to a secured position, the apparatus comprising:

a substantially cylindrical body having a toothed central bore therein sized to closely surround and engage a periphery of the wheel nut, said cylindrical body having a gap substantially aligned with said central axis, wherein said gap is disposed between a pair of opposed arms, extending between proximate and distal ends, said proximate ends being secured to said cylindrical body and said distal ends forming said gap therebetween, wherein said arms are cantilever towards each other and are radially biased towards a center of said toothed central bore and form a portion of said central toothed bore therein so as to permit said cylindrical body to be radially expandable;

a first extension extending perpendicularly from said body, said first extension having an indicator thereon; and a second extension extending perpendicularly from said body to an opposed side thereof, said second extension having a distal end adapted to overlap and engage with a first extension of an adjacent apparatus for locking and flagging an adjacent wheel nut so as to cover said indicator of said adjacent apparatus when said wheel nut is in the secured position.

2. The apparatus of claim 1 wherein said slot is located adjacent to said second extension.

3. The apparatus of claim 2 wherein arms are separated from said second extension by a slot.

4. The apparatus of claim 3 wherein said slot is semi-circular.

5. The apparatus of claim 4 wherein said slot extends between 55 and 165 degrees around said central axis.

6. The apparatus of claim 1 wherein said indicator comprises an aperture extending through said first extension.

7. The apparatus of claim 6 wherein said aperture has a triangular shape.

8. The apparatus of claim 1 wherein said central bore extends between front and rear end surfaces.

9. The apparatus of claim 8 wherein said toothed central bore includes a tapered inlet adjacent to said rear surface of said toothed central bore.

* * * * *